United States Patent
Zhong et al.

(10) Patent No.: US 10,321,428 B2
(45) Date of Patent: Jun. 11, 2019

(54) MOBILE TERMINAL POSITIONING METHOD, APPARATUS, DEVICE, AND SERVER

(71) Applicant: Huawei Technologies Co., Ltd., Shenzhen, Guangdong (CN)

(72) Inventors: Chao Zhong, Shenzhen (CN); Benfeng Wei, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/557,774

(22) PCT Filed: Apr. 20, 2015

(86) PCT No.: PCT/CN2015/076987
§ 371 (c)(1),
(2) Date: Sep. 12, 2017

(87) PCT Pub. No.: WO2016/168971
PCT Pub. Date: Oct. 27, 2016

(65) Prior Publication Data
US 2018/0077678 A1    Mar. 15, 2018

(51) Int. Cl.
*G01S 5/02* (2010.01)
*H04W 4/20* (2018.01)
(Continued)

(52) U.S. Cl.
CPC .............. *H04W 64/003* (2013.01); *G01S 5/02* (2013.01); *H04W 4/20* (2013.01); *H04W 8/02* (2013.01);
(Continued)

(58) Field of Classification Search
CPC ....... H04W 64/00; H04W 4/02; H04W 4/021; H04W 4/023; H04W 88/06;
(Continued)

(56) References Cited

U.S. PATENT DOCUMENTS 8,195,190 B1 *  6/2012  Hou ...................... G01S 5/0263
                                                    455/432.2
2003/0148771 A1   8/2003  De Verteuil
(Continued)

FOREIGN PATENT DOCUMENTS

CN       1770912 A    5/2006
CN       1859797 A    11/2006
(Continued)

*Primary Examiner* — Nam T Huynh

(57) ABSTRACT

Embodiments of the present invention disclose a mobile terminal positioning method, apparatus, device, and server. When being applicable to a mobile terminal, the method includes: obtaining auxiliary positioning information, where the auxiliary positioning information includes network identifiers of different wireless networks found by the mobile terminal; reporting the auxiliary positioning information to a server, so that the server obtains current location information of the mobile terminal according to the auxiliary positioning information; and receiving the current location information delivered by the server. Therefore, the server may obtain more available information from the mobile terminal, and a coverage area relationship between multiple wireless networks in a same area may be used to narrow a positioning range, so as to obtain a more accurate location of the mobile terminal. This resolves a technical problem that positioning precision of a mobile terminal is not high in a base station positioning service.

7 Claims, 8 Drawing Sheets

(51) Int. Cl.
    *H04W 8/02*         (2009.01)
    *H04W 64/00*      (2009.01)
    *H04W 88/18*      (2009.01)

(52) U.S. Cl.
    CPC ......... *H04W 64/00* (2013.01); *H04W 64/006* (2013.01); *H04W 88/18* (2013.01)

(58) Field of Classification Search
    CPC . H04W 64/003; H04W 88/18; H04W 64/006; H04W 8/02; H04W 4/20; H04L 67/18; G01S 5/02
    See application file for complete search history.

(56) References Cited

U.S. PATENT DOCUMENTS

| | | | | |
|---|---|---|---|---|
| 2005/0202828 A1* | 9/2005 | Pecen | ............... | H04W 36/0055 455/453 |
| 2008/0248813 A1* | 10/2008 | Chatterjee | ................ | G01S 1/68 455/456.2 |
| 2009/0160711 A1* | 6/2009 | Mehta | ................... | G01S 5/0205 342/450 |
| 2015/0105098 A1 | 4/2015 | Sridhara et al. | | |

FOREIGN PATENT DOCUMENTS

| | | |
|---|---|---|
| CN | 1863387 A | 11/2006 |
| CN | 102348258 A | 2/2012 |
| CN | 103369668 A | 10/2013 |
| EP | 2775744 A1 | 9/2014 |

\* cited by examiner

MOBILE TERMINAL POSITIONING METHOD, APPARATUS, DEVICE, AND SERVER

CROSS REFERENCE TO RELATED APPLICATIONS

This application is a National Stage of International Application No. PCT/CN2015/076987, filed on Apr. 20, 2015, which is hereby incorporated by reference in its entirety.

TECHNICAL FIELD

The present invention relates to the field of mobile communications technologies, and in particular, to a mobile terminal positioning method, apparatus, device, and server.

BACKGROUND

A base station positioning service for a mobile terminal such as a mobile phone is also referred to as a location based service (LBS, Location Based Service), which is a value added service for obtaining, from a network of an operator, for example, a GSM (Global System for Mobile communications, Global System for Mobile Communications) network, location information of a mobile terminal user, for example, longitude and latitude coordinates, and providing a corresponding service for the user with support from an electronic map platform, and is another mainstream positioning technology different from GPS (Global Positioning System, Global Positioning System) positioning and WiFi (Wireless Fidelity, Wireless Fidelity) positioning. Compared with the GPS, the base station positioning has an advantage of supporting positioning indoors and in a badly sheltered area. Compared with the WiFi positioning, because coverage of a global mobile wireless communications network is far better than coverage of a WiFi network, the base station positioning also has a relatively wider application field.

In the prior art, a positioning technology based on a single cell ID (Identity, identity) is usually used in a base station positioning service. A minimum division unit of a cellular network may be referred to as a "cell", and different cells form a currently universal wireless mobile communications network in a cellular combination manner. After a mobile terminal is registered with a wireless mobile communications network, a currently registered cell ID may be reported to a location service provider, and after searching, according to the reported cell ID, a database storing location information such as a longitude and a latitude that are corresponding to each cell, the location service provider may obtain location information of a cell in which the terminal is currently located, and then the location service provider sends the location information to the mobile terminal, so as to complete the positioning.

However, precision of the positioning by using this technology depends on a radius and coverage density of a cellular cell, and the positioning precision is not high, especially in many areas in which base stations are relatively dispersedly distributed, and a cell has a relatively large radius, which may even reach thousands of meters. This means that the positioning precision can be roughly thousands of meters only, and the precision is much lower.

SUMMARY

Embodiments of the present invention provide a mobile terminal positioning method, apparatus, device, and server, so as to resolve a problem that positioning precision of a mobile terminal is not high in a base station positioning service.

To resolve the foregoing technical problem, the present invention discloses the following technical solutions:

According to a first aspect, the present invention provides a mobile terminal positioning method, where the method is applicable to a mobile terminal, and the method includes:

obtaining auxiliary positioning information, where the auxiliary positioning information includes network identifiers of different wireless networks found by the mobile terminal;

reporting the auxiliary positioning information to a server, so that the server obtains current location information of the mobile terminal according to the auxiliary positioning information; and receiving the current location information delivered by the server.

With reference to the first aspect, in a first possible implementation manner of the first aspect, the obtaining auxiliary positioning information includes:

performing full-band network search separately according to different types of wireless networks to obtain the auxiliary positioning information.

With reference to the first aspect, in a second possible implementation manner of the first aspect, the obtaining auxiliary positioning information includes:

reporting a network identifier of a current network to the server, where the current network is a network with which the mobile terminal has currently registered;

receiving auxiliary search information delivered by the server, where the auxiliary search information includes information about another wireless network that is located in a same area as the current network; and performing network search according to the auxiliary search information to obtain the auxiliary positioning information.

With reference to the first or the second possible implementation manner of the first aspect, in a third possible implementation manner of the first aspect, the performing network search includes:

performing the network search in an idle time of a current application layer service.

According to a second aspect, the present invention provides a mobile terminal positioning method, where the method is applicable to a server, and the method includes:

receiving auxiliary positioning information reported by a mobile terminal, where the auxiliary positioning information includes network identifiers of different wireless networks found by the mobile terminal;

obtaining corresponding coverage areas of the different wireless networks according to the network identifiers of the different wireless networks;

obtaining current location information of the mobile terminal according to the coverage areas of the different wireless networks; and delivering the current location information to the mobile terminal.

With reference to the second aspect, in a first possible implementation manner of the second aspect, the obtaining current location information of the mobile terminal according to the coverage areas of the different wireless networks includes:

superimposing the coverage areas of the different wireless networks; and obtaining the current location information of the mobile terminal according to an intersectant area obtained by means of superimposition.

With reference to the second aspect, in a second possible implementation manner of the second aspect, before the receiving auxiliary positioning information reported by a mobile terminal, the method further includes:

receiving a network identifier that is of a current network and that is reported by the mobile terminal, where the current network is a network with which the mobile terminal has currently registered;

finding, in a preset database according to the network identifier of the current network, another wireless network that is located in a same area as the current network; and delivering auxiliary search information to the mobile terminal, where the auxiliary search information includes information about the another wireless network, so that the mobile terminal performs network search according to the auxiliary search information to obtain the auxiliary positioning information.

With reference to the second possible implementation manner of the second aspect, in a third possible implementation manner of the second aspect, before the delivering auxiliary search information to the mobile terminal, the method further includes:

screening the auxiliary search information according to a preset rule.

According to a third aspect, the present invention provides a mobile terminal positioning apparatus, where the apparatus includes:

an auxiliary positioning information obtaining module, configured to obtain auxiliary positioning information, where the auxiliary positioning information includes network identifiers of different wireless networks found by the mobile terminal;

an auxiliary positioning information reporting module, configured to report the auxiliary positioning information to a server, so that the server obtains current location information of the mobile terminal according to the auxiliary positioning information; and a location information receiving module, configured to receive the current location information delivered by the server.

With reference to the third aspect, in a first possible implementation manner of the third aspect, the auxiliary positioning information obtaining module is configured to:

perform full-band network search separately according to different types of wireless networks to obtain the auxiliary positioning information.

With reference to the third aspect, in a second possible implementation manner of the third aspect, the auxiliary positioning information obtaining module includes:

a network identifier reporting submodule, configured to report a network identifier of a current network to the server, where the current network is a network with which the mobile terminal has currently registered;

an auxiliary search information receiving submodule, configured to receive auxiliary search information delivered by the server, where the auxiliary search information includes information about another wireless network that is located in a same area as the current network; and a network search submodule, configured to perform network search according to the auxiliary search information to obtain the auxiliary positioning information.

With reference to the first or the second possible implementation manner of the third aspect, in a third possible implementation manner of the third aspect, when the auxiliary positioning information obtaining module performs the network search, the apparatus is configured to:

perform the network search in an idle time of a current application layer service.

According to a fourth aspect, the present invention provides a mobile terminal positioning apparatus, where the apparatus includes:

an auxiliary positioning information receiving module, configured to receive auxiliary positioning information reported by a mobile terminal, where the auxiliary positioning information includes network identifiers of different wireless networks found by the mobile terminal;

a location information obtaining module, configured to obtain corresponding coverage areas of the different wireless networks according to the network identifiers of the different wireless networks, and obtain current location information of the mobile terminal according to the coverage areas of the different wireless networks; and a location information delivering module, configured to deliver the current location information to the mobile terminal.

With reference to the fourth aspect, in a first possible implementation manner of the fourth aspect, when the location information obtaining module obtains the current location information of the mobile terminal according to the coverage areas of the different wireless networks, the apparatus is configured to:

superimpose the coverage areas of the different wireless networks; and obtain the current location information of the mobile terminal according to an intersectant area obtained by means of superimposition.

With reference to the fourth aspect, in a second possible implementation manner of the fourth aspect, the apparatus further includes:

an auxiliary search information delivering module, configured to: receive a network identifier that is of a current network and that is reported by a mobile terminal, where the current network is a network with which the mobile terminal has currently registered; find, in a preset database according to the network identifier of the current network, another wireless network that is located in a same area as the current network; and deliver auxiliary search information to the mobile terminal, where the auxiliary search information includes information about the another wireless network, so that the mobile terminal performs network search according to the auxiliary search information to obtain the auxiliary positioning information.

With reference to the second possible implementation manner of the fourth aspect, in a third possible implementation manner of the fourth aspect, the apparatus further includes:

an auxiliary search information screening module, configured to: before the auxiliary search information is delivered to the mobile terminal, screen the auxiliary search information according to a preset rule.

According to a fifth aspect, the present invention provides a mobile terminal positioning device, including a processor and a transceiver module, where the transceiver module is configured to search for network identifiers of different wireless networks;

the processor is configured to obtain auxiliary positioning information, where the auxiliary positioning information includes the network identifiers of the different wireless networks found by the transceiver module;

the transceiver module is further configured to report the auxiliary positioning information to a server, so that the server obtains current location information of the mobile terminal according to the auxiliary positioning information; and the transceiver module is further configured to receive the current location information delivered by the server.

With reference to the fifth aspect, in a first possible implementation manner of the fifth aspect, the processor is configured to obtain the auxiliary positioning information, where the transceiver module is configured to perform full-band network search separately according to different types of wireless networks to obtain the auxiliary positioning information, and send the auxiliary positioning information to the processor.

With reference to the fifth aspect, in a second possible implementation manner of the fifth aspect, the processor is configured to obtain the auxiliary positioning information, where the transceiver module is configured to report a network identifier of a current network to the server, where the current network is a network with which the mobile terminal has currently registered;

the transceiver module is further configured to receive auxiliary search information delivered by the server, where the auxiliary search information includes information about another wireless network that is located in a same area as the current network;

the transceiver module is further configured to perform network search according to the auxiliary search information; and the processor is further configured to obtain the auxiliary positioning information that is sent by the transceiver module.

With reference to the first or the second possible implementation manner of the fifth aspect, in a third possible implementation manner of the fifth aspect, the transceiver module is configured to perform the network search, where the transceiver module is configured to perform the network search in an idle time of a current application layer service.

According to a sixth aspect, the present invention provides a mobile terminal positioning server, including a transceiver module and a processor, where the transceiver module is configured to receive auxiliary positioning information reported by a mobile terminal, where the auxiliary positioning information includes network identifiers of different wireless networks found by the mobile terminal;

the processor is configured to obtain corresponding coverage areas of the different wireless networks according to the network identifiers of the different wireless networks;

the processor is further configured to obtain current location information of the mobile terminal according to the coverage areas of the different wireless networks; and the transceiver module is further configured to deliver the current location information to the mobile terminal.

With reference to the sixth aspect, in a first possible implementation manner of the sixth aspect, the processor is configured to obtain the current location information of the mobile terminal according to the coverage areas of the different wireless networks, where the processor is configured to superimpose the coverage areas of the different wireless networks; and the processor is further configured to obtain the current location information of the mobile terminal according to an intersectant area obtained by means of superimposition.

With reference to the sixth aspect, in a second possible implementation manner of the sixth aspect, the transceiver module is further configured to:

before the transceiver module is further configured to receive the auxiliary positioning information reported by the mobile terminal, the transceiver module is further configured to receive a network identifier that is of a current network and that is reported by the mobile terminal, where the current network is a network with which the mobile terminal has currently registered;

the processor is configured to find, in a preset database according to the network identifier of the current network, another wireless network that is located in a same area as the current network; and the transceiver module is further configured to deliver auxiliary search information to the mobile terminal, where the auxiliary search information includes information about the another wireless network, so that the mobile terminal performs network search according to the auxiliary search information to obtain the auxiliary positioning information.

With reference to the second possible implementation manner of the sixth aspect, in a third possible implementation manner of the sixth aspect, the processor is further configured to: before the transceiver module delivers the auxiliary search information to the mobile terminal, screen the auxiliary search information according to a preset rule.

In the embodiments of the present invention, when using a base station positioning service, a mobile terminal may report network identifiers of different wireless networks found to a server of a location service provider, so that the server may obtain more available information, and in this case, a coverage area relationship between multiple wireless networks in a same area may be used to narrow a positioning range, so as to obtain a more accurate location of the mobile terminal. This resolves a technical problem that positioning precision of a mobile terminal is not high in a base station positioning service.

In addition, before searching for different wireless networks at a current location, a mobile terminal may first report a current registered network to a server, and the server obtains another network that may exist in an area in which the current registered network is located, and notifies the mobile terminal. In this way, the mobile terminal performs targeted search instead of full-band exhaustive search, so that positioning time is reduced and positioning efficiency is improved.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, a person of ordinary skill in the art may still derive other drawings from these accompanying drawings without creative efforts.

DETAILED DESCRIPTION

To make a person skilled in the art understand the technical solutions in the embodiments of the present invention better, and make the objectives, features, and advantages of the embodiments of the present invention clearer, the following further describes the technical solutions in the embodiments of the present invention in detail with reference to the accompanying drawings.

Figure 1:
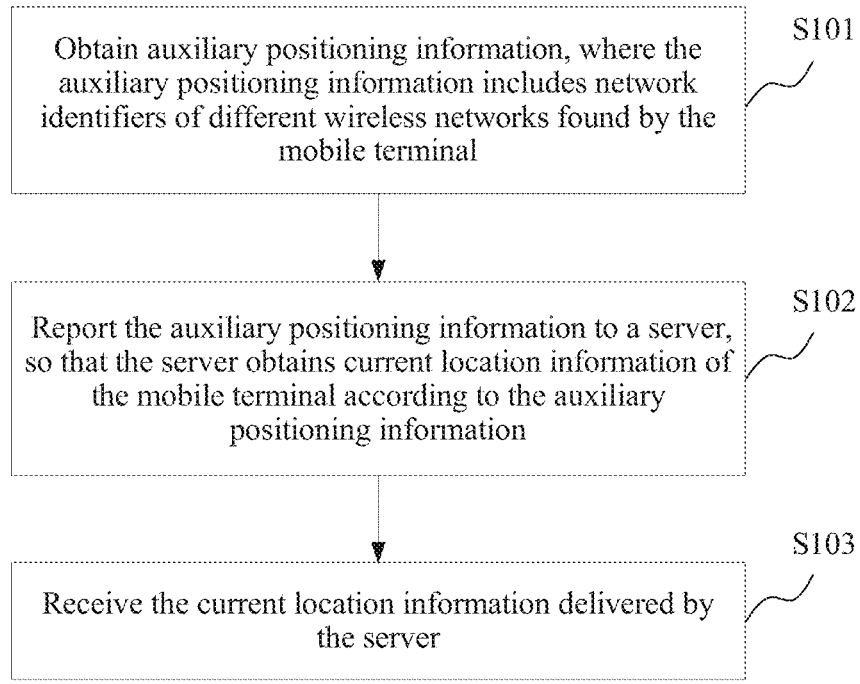
FIG. 1 is a flowchart of a mobile terminal positioning method according to an embodiment of the present invention.

FIG. 1 is a flowchart of a mobile terminal positioning method according to an embodiment of the present invention. The method may be applicable to mobile terminals such as a mobile phone, a tablet computer, a PDA (Personal Digital Assistant, personal digital assistant), a POS (Point of Sales, point of sales), and an in-vehicle computer. Referring to FIG. 1, the method may include the following steps.

Step S101: Obtain auxiliary positioning information, where the auxiliary positioning information includes network identifiers of different wireless networks found by the mobile terminal.

A wireless network used in this embodiment may be a mobile communications network, such as a China Mobile 2G, 3G, or 4G network, a China Unicom 2G, 3G, or 4G network, or may be another wireless network, such as a WiFi network. In addition, it is easily understood that a wireless network usually has a regional characteristic, that is, a wireless network actually includes many subnetworks. For example, the China Mobile 2G network actually includes many 2G base station cells, and therefore, a network identifier (for example, a cell ID) is further required to indicate which subnetwork a found wireless network is.

A mobile phone using a China Mobile SIM card is used as an example. Assuming that the mobile phone can support multiple wireless network types, such as the China Mobile 2G, 3G, and 4G, the China Unicom 2G and 3G, and the WiFi, in this embodiment, the auxiliary positioning information may include a cell ID of a China Mobile 2G network, a cell ID of a China Mobile 3G network, and a cell ID of a China Mobile 4G network that are found by the mobile phone at a location of the mobile phone and that may provide a service for the mobile phone, and may further include a cell ID of a China Unicom 2G network, a cell ID of a China Unicom 3G network, and a cell ID of a China Unicom 4G network that are found by the mobile phone, and an SSID (Service Set Identifier, service set identifier) of a WiFi network. Certainly, currently, in many cases, an operator may provide 2G, 3G, and 4G services by using only one base station, and therefore, corresponding three cell IDs may be combined into one.

In a process of implementing the present invention, the inventor finds that when a cell ID-based positioning technology is used, although a mobile terminal reports a cell ID of a current serving network to a location service provider, little information is reported, and a location provider can locate the mobile terminal only in a geographical area range corresponding to the cell ID. Consequently, positioning precision is not high, and if a coverage area of the cell is quite large, the positioning precision is much lower. Therefore, in this embodiment, the mobile terminal mobile reports all the network identifiers of the found different wireless networks to the server. Generally, after finding a registered network, a mobile terminal does not need to search for other different wireless networks. In this embodiment, although searching for different wireless networks consumes some time and power, more information of more positioning significance may be reported, so that a condition is created for improving positioning precision when a server locates a mobile terminal.

Step S102: Report the auxiliary positioning information to a server, so that the server obtains current location information of the mobile terminal according to the auxiliary positioning information.

For example, in a same area range, base stations of different operators usually have different locations, and therefore, coverage areas of cells of the base stations are different, and a server may narrow a positioning range by combining these coverage areas, and further improve positioning precision of a mobile terminal.

Step S103: Receive the current location information delivered by the server.

In this embodiment, the server may obtain more available information, and in this case, a coverage area relationship between multiple wireless networks in a same area may be used to narrow a positioning range, so as to obtain a more accurate location of the mobile terminal. This resolves a technical problem that positioning precision of a mobile terminal is not high in a base station positioning service.

For how to obtain the auxiliary positioning information, no limitation is set in this embodiment. For example, full-band network search is performed separately according to different types of wireless networks to obtain the auxiliary positioning information.

For example, if a mobile phone supports these different types of wireless networks: China Mobile 2G, 3G, and 4G networks, China Unicom 2G and 3G networks, and a WiFi network, full-band network search, which is similar to exhaustive search, may be performed separately under these networks, so as to find as many cell IDs as possible.

This manner is relatively simple and easy. However, the full-band network search needs to be performed separately according to different types of wireless networks, and therefore much time and power may be consumed. Specially, as wireless network types supported by a mobile terminal increase, search time becomes increasingly longer, which is basically about tens of seconds, or even exceeds one minute.

Figure 2:
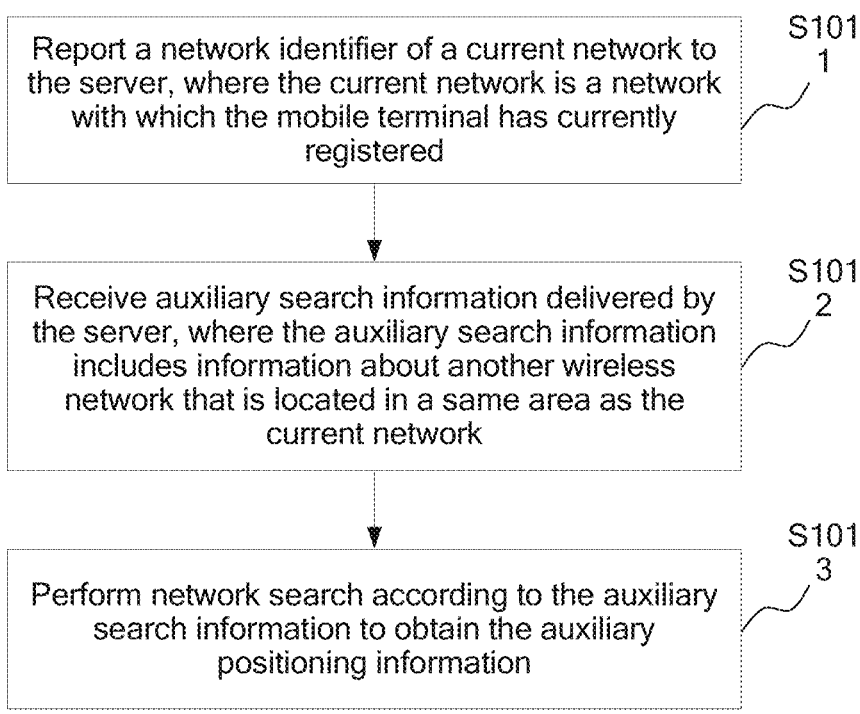
FIG. 2 is a flowchart of a mobile terminal positioning method according to another embodiment of the present invention.

Referring to FIG. 2, in this embodiment or some other embodiments of the present invention, the auxiliary positioning information may be obtained in the following manners.

Step S1011: Report a network identifier of a current network to the server, where the current network is a network with which the mobile terminal has currently registered. For example, the network identifier of the current network may be a cell ID.

Step S1012: Receive auxiliary search information delivered by the server, where the auxiliary search information includes information about another wireless network that is located in a same area as the current network.

For example, after receiving a cell ID that is reported by the mobile terminal and that is of a cell with which the mobile terminal is registered, the server may learn, by using a database, another wireless network that may exist in the area, such as a standard and a frequency of another wireless network, or information about a WiFi network that may exist. In this way, the mobile terminal may be instructed to perform targeted and purposeful search, instead of blindly performing exhaustive network search for various wireless network in a full-band manner.

Step S1013: Perform network search according to the auxiliary search information to obtain the auxiliary positioning information.

Therefore, by using the auxiliary search information provided by the server, the mobile terminal performs targeted search instead of full-band exhaustive search, so that positioning time is reduced and positioning efficiency is improved.

For example, it is assumed that a mobile phone supports these different types of wireless networks: China Mobile 2G, 3G, and 4G networks, China Unicom 2G and 3G networks, and a WiFi network. However, an area in which the mobile phone is currently located is a remote area, and there are only a China Mobile 2G network and a China Unicom 2G network. In this case, after receiving auxiliary search information from a server, the mobile phone may learn that networks that exist in this area are a China Mobile 2G network and a China Unicom 2G network, and respective frequencies of the two networks, and learn that there is no other network. Therefore, when performing network search to generate auxiliary positioning information, the mobile phone directly searches for corresponding frequencies of the two networks, without a need of performing full-band exhaustive search for the two networks, or even searching for a China Mobile 3G/4G network, a China Unicom 3G/4G network, a WiFi network, and the like, so that search time is reduced and a power waste is avoided.

In addition, in this embodiment or some other embodiments of the present invention, the network search may include:

performing the network search in an idle time of a current application layer service.

Currently, most mobile terminals are single transceivers. Briefly, at a specific moment, a terminal can have an interaction relationship with only one specific frequency. If a mobile terminal is required to capture information about another inter-frequency cell (an inter-system cell may also be considered as an inter-frequency cell), the mobile terminal needs to depart from a current serving cell at some specific moments. Therefore, during positioning by using this solution, if a user has a related service running at the same time, a service carried on the current serving cell may be affected. To avoid affecting user experience and perceiving service interruption on the user side, in this solution, when the mobile terminal needs to capture an inter-frequency/inter-system cell, according to a time segmentation principle, an idle time of a current application layer service may be fully used to perform network search, so as to avoid affecting an application layer service used by the user. Generally, when the mobile terminal is in use, most concurrent data services of a positioning action (for example, downloading a map at the same time) are discrete, and are not required to maintain service continuity, so that positioning may be completed by fully using an idle phase of a user service, and the concurrent services are not affected. For searching for a WiFi network, no limitation is set, and measurement may be performed at the same time of performing an application layer service.

Figure 3:
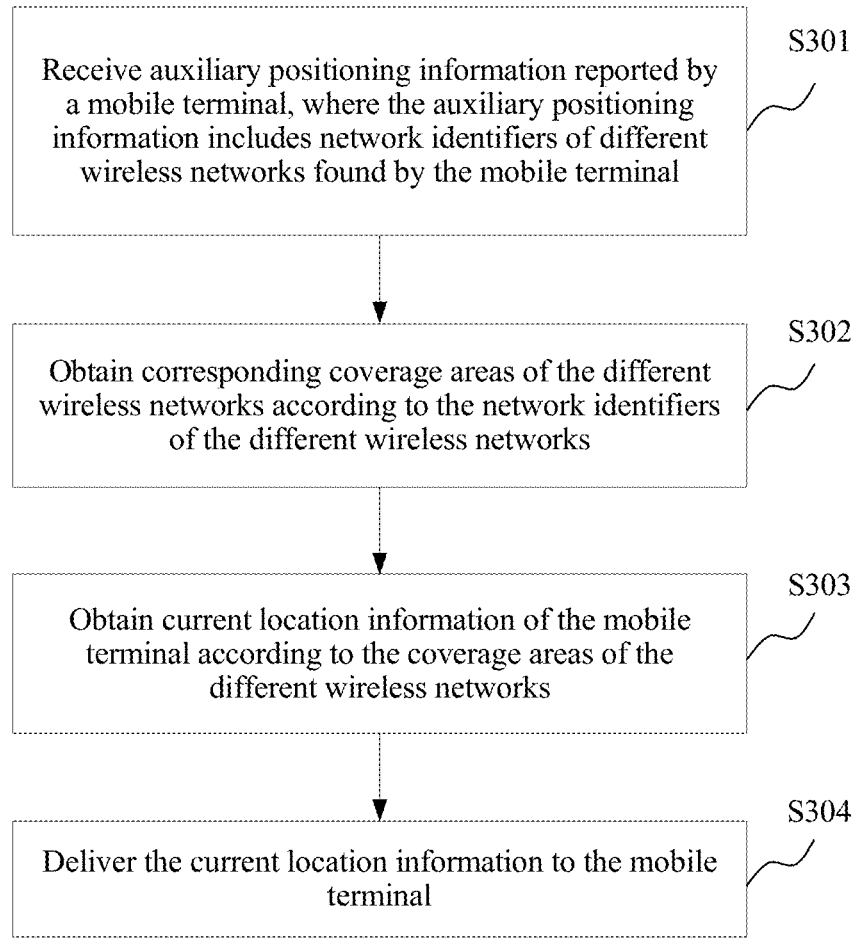
FIG. 3 is a flowchart of a mobile terminal positioning method according to another embodiment of the present invention.

FIG. 3 is a flowchart of a mobile terminal positioning method according to another embodiment of the present invention. The method may be applicable to a server. Referring to FIG. 3, the method may include:

Step S301: Receive auxiliary positioning information reported by a mobile terminal, where the auxiliary positioning information includes network identifiers of different wireless networks found by the mobile terminal.

Step S302: Obtain corresponding coverage areas of the different wireless networks according to the network identifiers of the different wireless networks.

Step S303: Obtain current location information of the mobile terminal according to the coverage areas of the different wireless networks.

Step S304: Deliver the current location information to the mobile terminal.

In this embodiment, the server may obtain more available information from the mobile terminal, and in this case, a coverage area relationship between multiple wireless networks in a same area may be used to narrow a positioning range, so as to obtain a more accurate location of the mobile terminal. This resolves a technical problem that positioning precision of a mobile terminal is not high in a base station positioning service.

Figure 4:
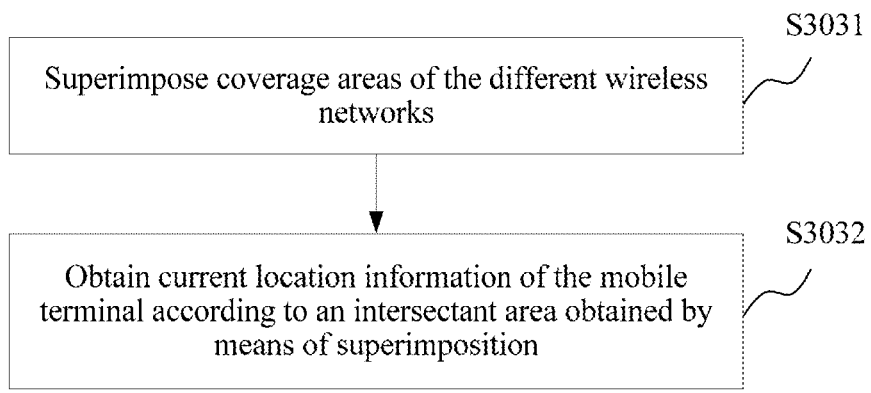
FIG. 4 is a flowchart of a mobile terminal positioning method according to another embodiment of the present invention.

Referring to FIG. 4, in this embodiment or some other embodiments of the present invention, the obtaining current location information of the mobile terminal according to the coverage areas of the different wireless networks may include:

Step S3031: Superimpose the coverage areas of the different wireless networks.

Step S3032: Obtain the current location information of the mobile terminal according to an intersectant area obtained by means of superimposition.

If only an ID of a cell in which the terminal is currently located is reported, positioning precision depends on a radius of the current cell, and the precision is limited. If a coverage area of the cell is virtualized as a circle, single cell positioning can be accurate only to the coverage area of the cell. If more cell information may be reported, a positioning range may be narrowed according to a superimposition principle, that is, a more precise location is obtained.

Figure 5:
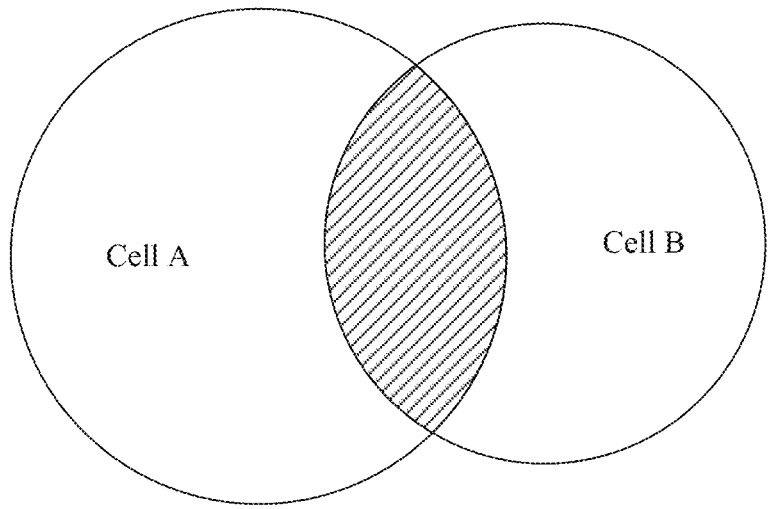
FIG. 5 is a schematic diagram of superimposing coverage areas of two cells according to an embodiment of the present invention.

For example, referring to FIG. 5, in FIG. 5, in addition to finding a cell A by searching, a mobile phone may further find a cell B by searching, and a location of the mobile phone may be further narrowed from a range of the cell A to an intersectant area of the two cells, that is, a shaded area.

Figure 6:
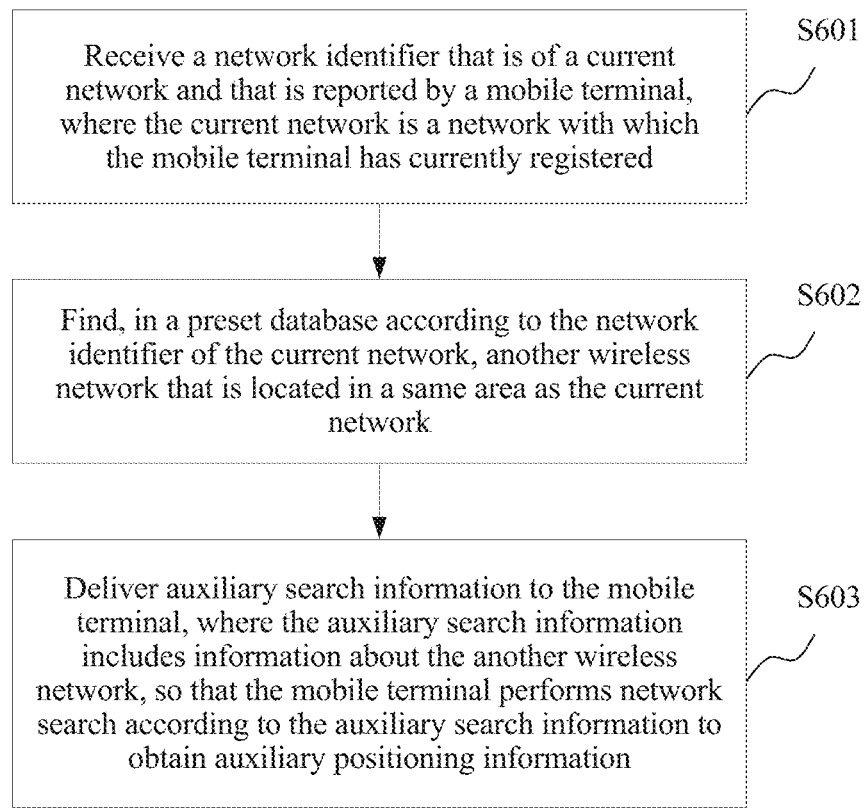
FIG. 6 is a flowchart of a mobile terminal positioning method according to another embodiment of the present invention.

Referring to FIG. 6, in this embodiment or some other embodiments of the present invention, before the receiving auxiliary positioning information reported by a mobile terminal, the method may further include:

Step S601: Receive a network identifier that is of a current network and that is reported by the mobile terminal, where the current network is a network with which the mobile terminal has currently registered.

Step S602: Find, in a preset database according to the network identifier of the current network, another wireless network that is located in a same area as the current network.

Step S603: Deliver auxiliary search information to the mobile terminal, where the auxiliary search information includes information about the another wireless network, so that the mobile terminal performs network search according to the auxiliary search information to obtain the auxiliary positioning information.

Therefore, by using the auxiliary search information provided by the server, the mobile terminal performs targeted search instead of full-band exhaustive search, so that positioning time is reduced and positioning efficiency is improved.

In addition, in a specific implementation process, after a server obtains, for the first time, a network identifier that is of a current network and that is reported by a mobile terminal, and then obtains a rough location of the mobile terminal, auxiliary search information may not be completely delivered at a time, and may be sent for multiple times according to a specific priority, so that the mobile terminal reports auxiliary positioning information found once after obtaining partial auxiliary search information each time. This gradually and progressively improves positioning precision by means of positioning for multiple times.

In addition, in this embodiment or some other embodiments of the present invention, before the delivering auxiliary search information to the mobile terminal, the method may further include:

screening the auxiliary search information according to a preset rule.

For example, if a mobile phone reports that the mobile phone is located in a China Mobile 3G cell A, a server may choose to deliver, according to a statistical and analysis result of historical data, auxiliary search information of greatest reference significance for further positioning. For example, auxiliary search information may be delivered to instruct a terminal to search for a China Unicom 3G cell, without a need of delivering information related to China Telecom that has a similar coverage area in this area as China Mobile, where the information is of little significance for further positioning. This may reduce an overall positioning time.

The following further describes the technical solution of the present invention with reference to a specific scenario.

Figure 7:
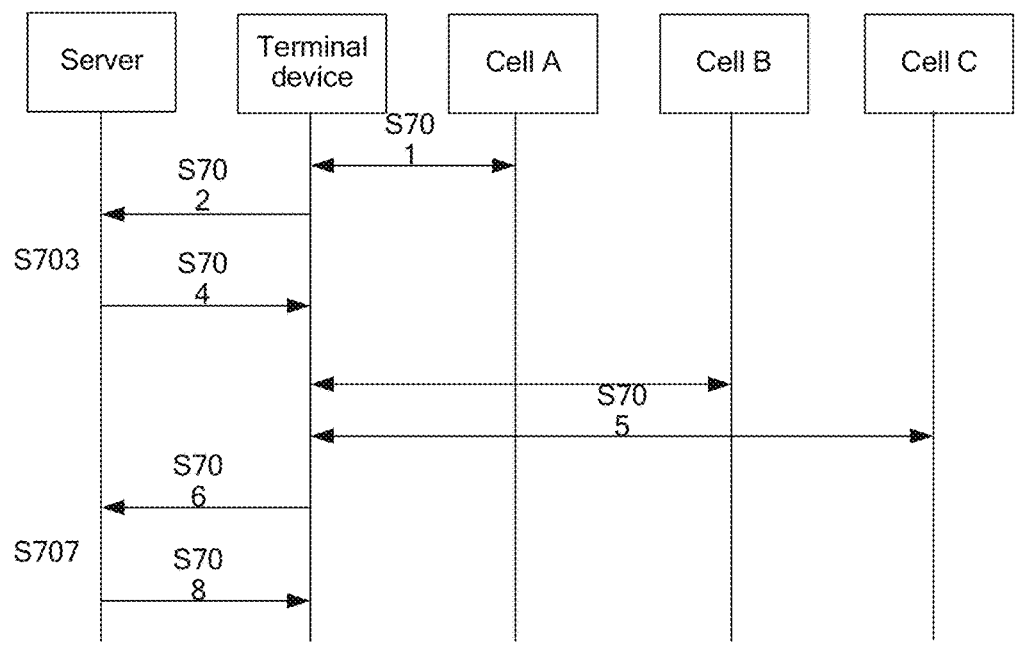
FIG. 7 is a schematic diagram of signaling of a mobile terminal positioning method according to an embodiment of the present invention.

FIG. 7 is a schematic diagram of signaling of a mobile terminal positioning method according to an embodiment of the present invention.

S701. A mobile terminal registers with a cell A of an operator of the mobile terminal.

S702. The mobile terminal reports the cell A to a server of a location service provider.

S703. The server obtains, according to the cell A, an area in which the mobile terminal is located, which is equivalent to obtaining a rough location of the mobile terminal, and then the server obtains, by using a database of the server, information about another network that is located in a same area as the cell A, so as to generate auxiliary search information.

S704. The server delivers the auxiliary search information to a terminal device.

S705. The terminal device quickly finds, by searching by using the auxiliary search information, a cell B and a cell C of another operator, and then generates auxiliary positioning information.

S706. The mobile terminal reports the auxiliary positioning information to the server.

S707. The server obtains more precise location information of the mobile terminal according to the auxiliary positioning information.

S708. The server delivers the location information of the mobile terminal to the mobile terminal.

Figure 8:
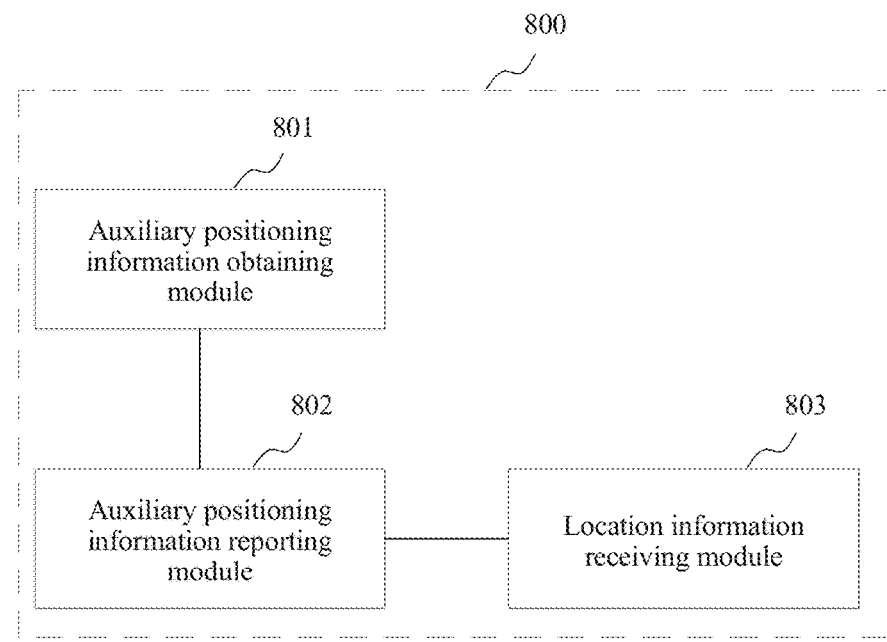
FIG. 8 is a schematic structural diagram of a mobile terminal positioning apparatus 800 according to an embodiment of the present invention.

FIG. 8 is a schematic structural diagram of a mobile terminal positioning apparatus 800 according to an embodiment of the present invention. The apparatus 800 may be applicable to mobile terminals such as a mobile phone, a tablet computer, a PDA (Personal Digital Assistant, personal digital assistant), a POS (Point of Sales, point of sales), and an in-vehicle computer. The apparatus 800 may execute the method applicable to a mobile terminal in the foregoing embodiment. Referring to FIG. 8, the apparatus 800 may include:

an auxiliary positioning information obtaining module 801, configured to obtain auxiliary positioning information, where the auxiliary positioning information includes network identifiers of different wireless networks found by the mobile terminal;

an auxiliary positioning information reporting module 802, configured to report the auxiliary positioning information to a server, so that the server obtains current location information of the mobile terminal according to the auxiliary positioning information; and a location information receiving module 803, configured to receive the current location information delivered by the server.

In this embodiment, the server may obtain more available information, and in this case, a coverage area relationship between multiple wireless networks in a same area may be used to narrow a positioning range, so as to obtain a more accurate location of the mobile terminal. This resolves a technical problem that positioning precision of a mobile terminal is not high in a base station positioning service.

In this embodiment or some other embodiments of the present invention, the auxiliary positioning information obtaining module 801 is configured to:

perform full-band network search separately according to different types of wireless networks to obtain the auxiliary positioning information.

Figure 9:
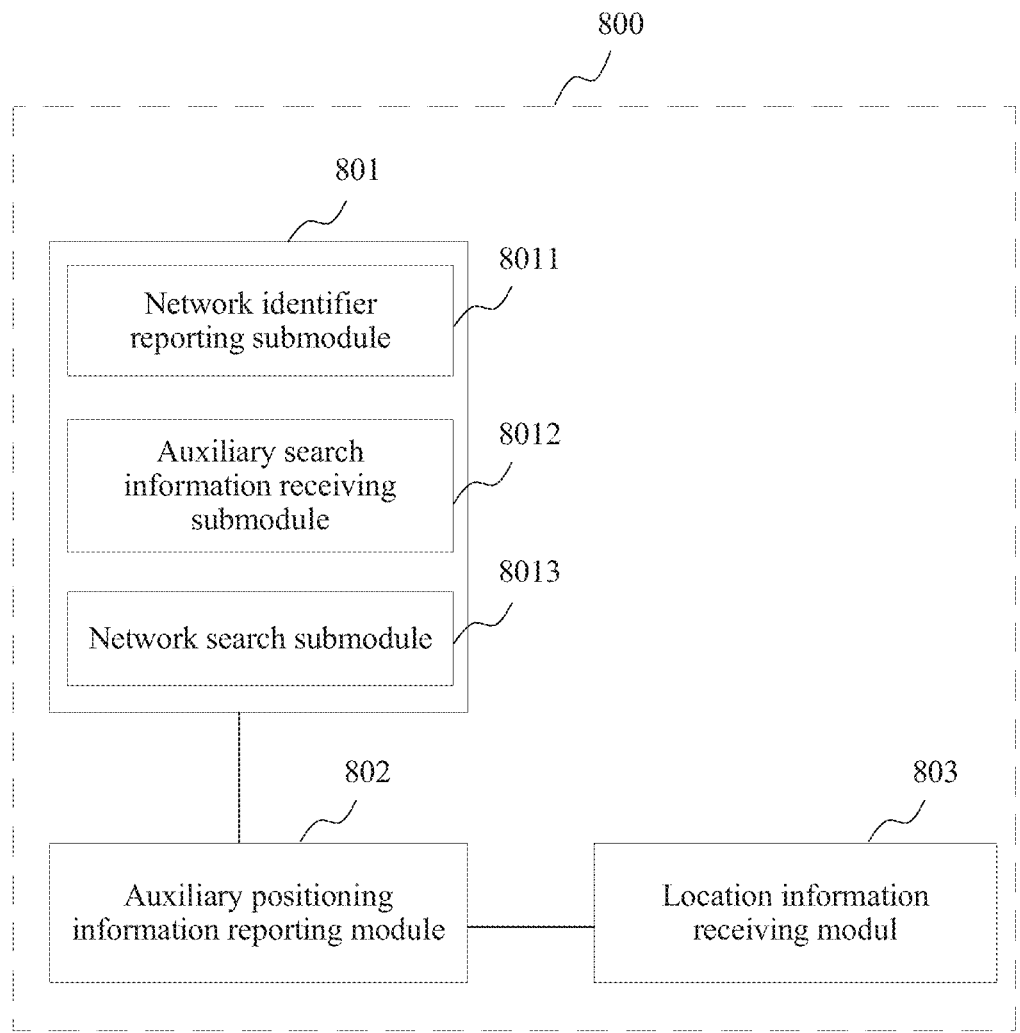
FIG. 9 is a schematic structural diagram of a mobile terminal positioning apparatus 800 according to another embodiment of the present invention.

Referring to FIG. 9, in this embodiment or some other embodiments of the present invention, the auxiliary positioning information obtaining module 801 includes:

a network identifier reporting submodule 8011, configured to report a network identifier of a current network to the server, where the current network is a network with which the mobile terminal has currently registered;

an auxiliary search information receiving submodule 8012, configured to receive auxiliary search information delivered by the server, where the auxiliary search information includes information about another wireless network that is located in a same area as the current network; and a network search submodule 8013, configured to perform network search according to the auxiliary search information to obtain the auxiliary positioning information.

Therefore, by using the auxiliary search information provided by the server, the mobile terminal performs targeted search instead of full-band exhaustive search, so that positioning time is reduced and positioning efficiency is improved.

In this embodiment or some other embodiments of the present invention, when the auxiliary positioning information obtaining module 801 performs the network search, the apparatus is configured to:

perform the network search in an idle time of a current application layer service.

Therefore, using an idle time of a current application layer service to perform network search may avoid affecting use of an application layer service, and prevent a user from perceiving service interruption, thereby helping improve user experience.

For the apparatus in the foregoing embodiment, specific manners of executing operations by each module are described in detail in the embodiments related to the method, and details are not described herein.

Figure 10:
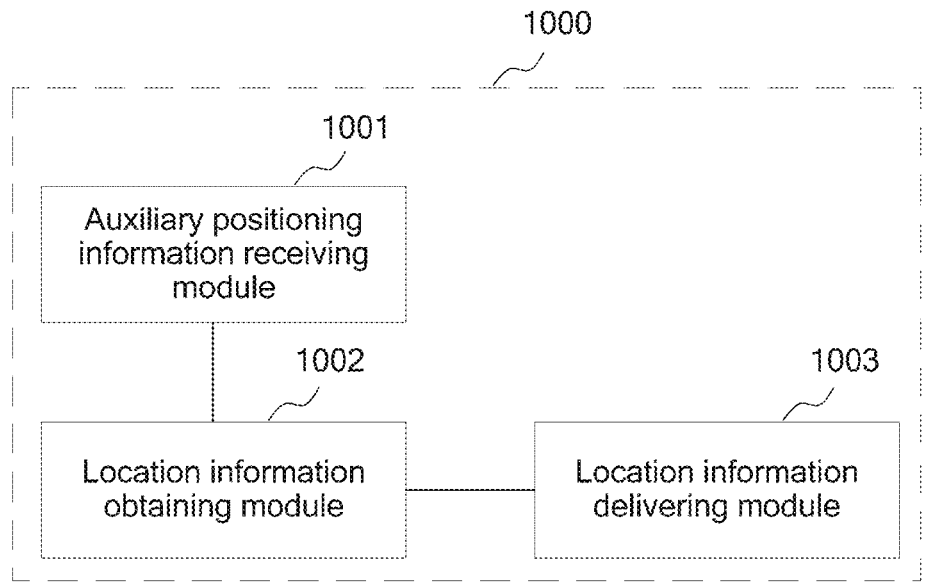
FIG. 10 is a schematic structural diagram of a mobile terminal positioning apparatus 1000 according to another embodiment of the present invention.

FIG. 10 is a schematic structural diagram of a mobile terminal positioning apparatus 1000 according to another embodiment of the present invention. The apparatus 1000 may be applicable to a server. The apparatus 1000 may execute the method applicable to a server in the foregoing embodiment. Referring to FIG. 10, the apparatus 1000 may include:

an auxiliary positioning information receiving module 1001, configured to receive auxiliary positioning information reported by a mobile terminal, where the auxiliary positioning information includes network identifiers of different wireless networks found by the mobile terminal;

a location information obtaining module 1002, configured to obtain corresponding coverage areas of the different wireless networks according to the network identifiers of the different wireless networks, and obtain current location information of the mobile terminal according to the coverage areas of the different wireless networks; and a location information delivering module 1003, configured to deliver the current location information to the mobile terminal.

In this embodiment, the server may obtain more available information from the mobile terminal, and in this case, a coverage area relationship between multiple wireless networks in a same area may be used to narrow a positioning range, so as to obtain a more accurate location of the mobile terminal. This resolves a technical problem that positioning precision of a mobile terminal is not high in a base station positioning service.

In this embodiment or some other embodiments of the present invention, when the location information obtaining module 1002 obtains the current location information of the mobile terminal according to the coverage areas of the different wireless networks, the apparatus is configured to:

superimpose the coverage areas of the different wireless networks; and obtain the current location information of the mobile terminal according to an intersectant area obtained by means of superimposition.

Figure 11:
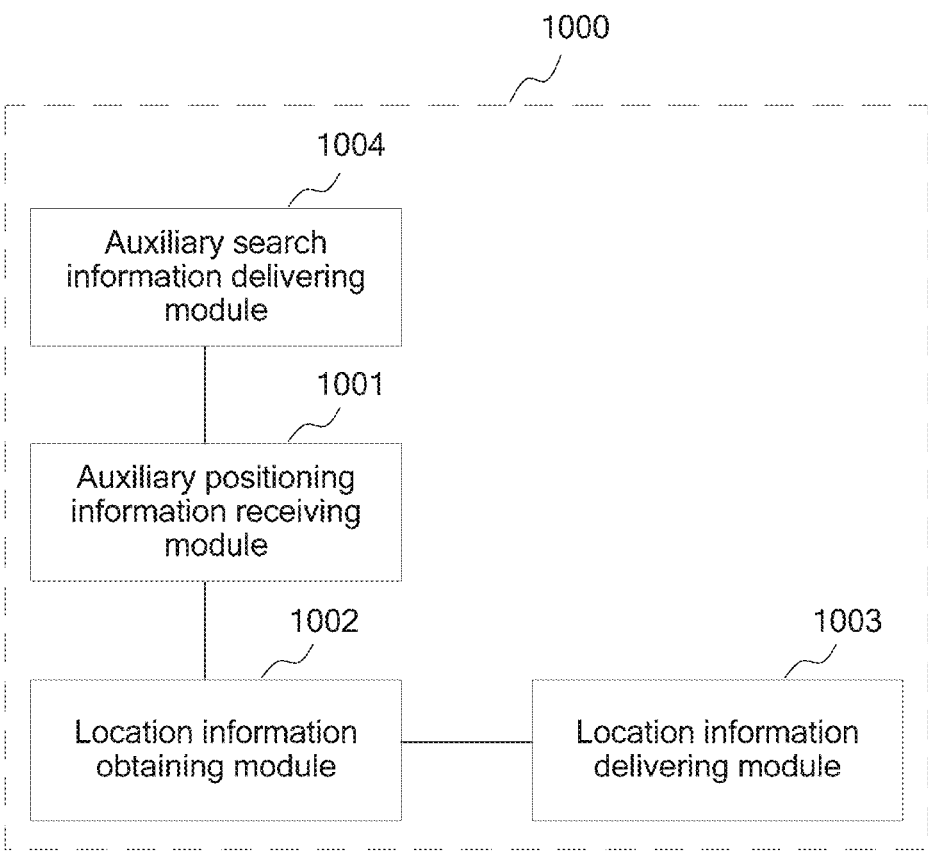
FIG. 11 is a schematic structural diagram of a mobile terminal positioning apparatus according to another embodiment of the present invention.

Referring to FIG. 11, in this embodiment or some other embodiments of the present invention, the apparatus 1000 may further include:

an auxiliary search information delivering module 1004, configured to: receive a network identifier that is of a current network and that is reported by a mobile terminal, where the current network is a network with which the mobile terminal has currently registered; find, in a preset database according to the network identifier of the current network, another wireless network that is located in a same area as the current network; and deliver auxiliary search information to the mobile terminal, where the auxiliary search information includes information about the another wireless network, so that the mobile terminal performs network search according to the auxiliary search information to obtain the auxiliary positioning information.

Therefore, by using the auxiliary search information provided by the server, the mobile terminal performs targeted search instead of full-band exhaustive search, so that positioning time is reduced and positioning efficiency is improved.

Figure 12:
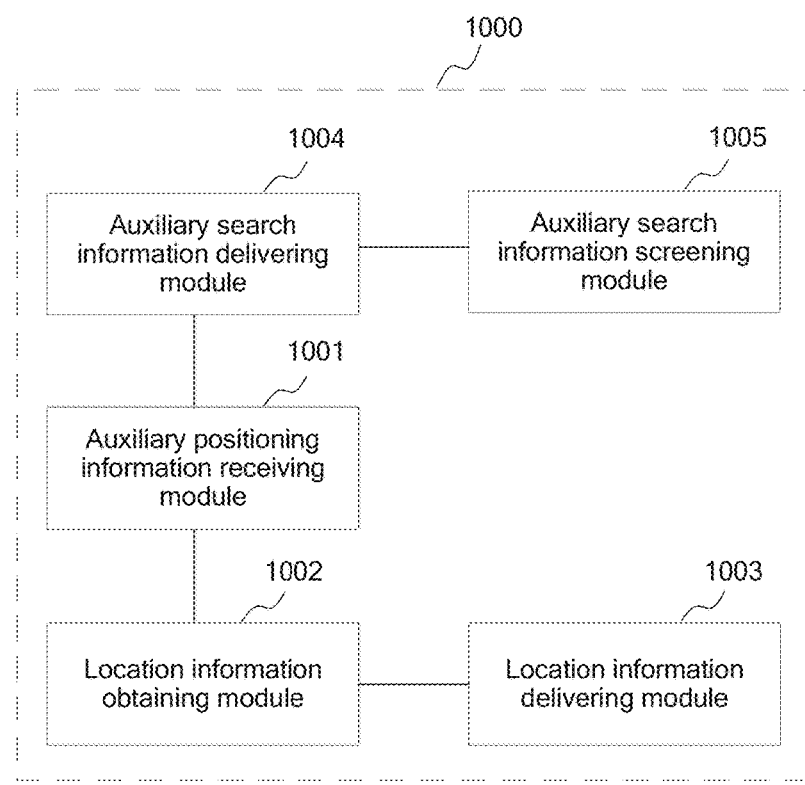
FIG. 12 is a schematic structural diagram of a mobile terminal positioning apparatus according to another embodiment of the present invention.

Referring to FIG. 12, in this embodiment or some other embodiments of the present invention, the apparatus 1000 may further include:

an auxiliary search information screening module 1005, configured to: before the auxiliary search information is delivered to the mobile terminal, screen the auxiliary search information according to a preset rule.

Therefore, during screening, auxiliary search information of greatest reference significance for further positioning may be chosen to be delivered, whereas information of little significance for further positioning is filtered out, so that time consumption of a positioning process may be further reduced.

For the apparatus in the foregoing embodiment, specific manners of executing operations by each module are described in detail in the embodiments related to the method, and details are not described herein.

Figure 13:
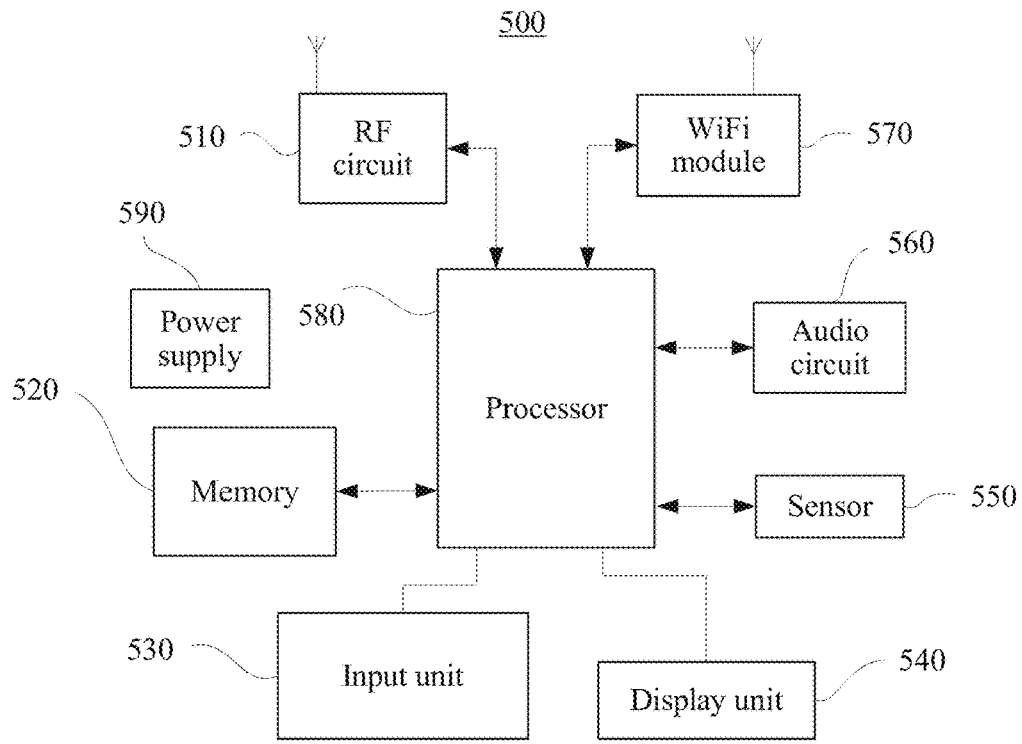
FIG. 13 is a schematic structural diagram of a mobile terminal positioning device 500 according to an embodiment of the present invention.

An embodiment of the present invention further provides a mobile terminal positioning device, which may be configured to execute the method applicable to a terminal device in the foregoing embodiment. FIG. 13 shows a schematic structural diagram of a mobile terminal positioning device 500 according to this embodiment.

Referring to FIG. 13, the mobile terminal positioning device 500 includes parts such as an RF (Radio Frequency, radio frequency) circuit 510, a memory 520, an input unit 530, a display unit 540, a sensor 550, an audio circuit 560, a WiFi module 570, a processor 580, and a power supply 590. A person skilled in the art may understand that a structure of the mobile terminal positioning device shown in FIG. 13 is merely used as an example of an implementation manner, but does not constitute a limitation on a mobile terminal positioning device, and may include parts more or fewer than those shown in the figure, or a combination of some parts, or different part arrangements.

In this embodiment, the RF circuit 510 and the WiFi module 570 may form a transceiver module. In some other embodiments of the present invention, a transceiver module may also include only the RF circuit 510 or the WiFi module 570, or include another part having a function of receiving and sending data. This is not limited in the present invention.

In this embodiment, the processor 580 and the transceiver module may have the following functions.

The transceiver module is configured to search for network identifiers of different wireless networks.

The processor 580 is configured to obtain auxiliary positioning information, where the auxiliary positioning information includes the network identifiers of the different wireless networks found by the transceiver module.

The transceiver module is further configured to report the auxiliary positioning information to a server, so that the server obtains current location information of the mobile terminal according to the auxiliary positioning information.

The transceiver module is further configured to receive the current location information delivered by the server.

In this embodiment, the server may obtain more available information, and in this case, a coverage area relationship between multiple wireless networks in a same area may be used to narrow a positioning range, so as to obtain a more accurate location of the mobile terminal. This resolves a technical problem that positioning precision of a mobile terminal is not high in a base station positioning service.

In this embodiment or some other embodiments of the present invention, the processor 580 is configured to obtain the auxiliary positioning information, where the transceiver module is configured to perform full-band network search separately according to different types of wireless networks to obtain the auxiliary positioning information, and send the auxiliary positioning information to the processor 580.

In this embodiment or some other embodiments of the present invention, the processor 580 is configured to obtain the auxiliary positioning information, where the transceiver module is configured to report a network identifier of a current network to the server, where the current network is a network with which the mobile terminal has currently registered;

the transceiver module is further configured to receive auxiliary search information delivered by the server, where the auxiliary search information includes information about another wireless network that is located in a same area as the current network;

the transceiver module is further configured to perform network search according to the auxiliary search information; and the processor 580 is further configured to obtain the auxiliary positioning information that is sent by the transceiver module.

Therefore, by using the auxiliary search information provided by the server, the mobile terminal performs targeted search instead of full-band exhaustive search, so that positioning time is reduced and positioning efficiency is improved.

In this embodiment or some other embodiments of the present invention, the transceiver module is configured to perform the network search, where the transceiver module is configured to perform the network search in an idle time of a current application layer service.

Therefore, using an idle time of a current application layer service to perform network search may avoid affecting use of an application layer service, and prevent a user from perceiving service interruption, thereby helping improve user experience.

Figure 14:
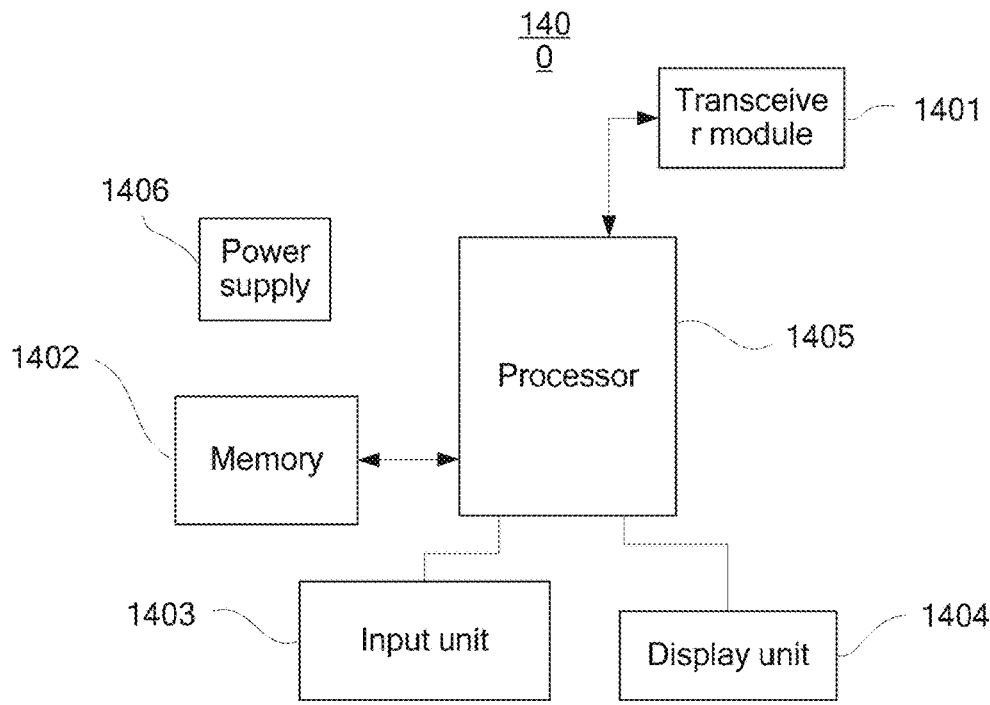
FIG. 14 is a schematic structural diagram of a mobile terminal positioning server 1400 according to another embodiment of the present invention.

An embodiment of the present invention further provides a mobile terminal positioning server, which may be configured to execute the method applicable to a server in the foregoing embodiment. FIG. 14 shows a schematic structural diagram of a mobile terminal positioning server 1400 according to this embodiment.

Referring to FIG. 14, the server 1400 includes parts such as a transceiver module 1401, a memory 1402, an input unit 1403, a display unit 1404, a processor 1405, and a power supply 1406. A person skilled in the art may understand that a structure of the server shown in FIG. 14 is merely used as an example of an implementation manner, but does not constitute a limitation on a server, and may include parts more or fewer than those shown in the figure, or a combination of some parts, or different part arrangements.

In this embodiment, the processor 1405 and the transceiver module 1401 may have the following functions.

The transceiver module 1401 is configured to receive auxiliary positioning information reported by a mobile terminal, where the auxiliary positioning information includes network identifiers of different wireless networks found by the mobile terminal.

The processor 1405 is configured to obtain corresponding coverage areas of the different wireless networks according to the network identifiers of the different wireless networks.

The processor 1405 is further configured to obtain current location information of the mobile terminal according to the coverage areas of the different wireless networks.

The transceiver module 1401 is further configured to deliver the current location information to the mobile terminal.

In this embodiment, the server may obtain more available information from the mobile terminal, and in this case, a coverage area relationship between multiple wireless networks in a same area may be used to narrow a positioning range, so as to obtain a more accurate location of the mobile terminal. This resolves a technical problem that positioning precision of a mobile terminal is not high in a base station positioning service.

In this embodiment or some other embodiments of the present invention, the processor 1405 is configured to obtain the current location information of the mobile terminal according to the coverage areas of the different wireless networks, where the processor 1405 is configured to superimpose the coverage areas of the different wireless networks; and the processor 1405 is further configured to obtain the current location information of the mobile terminal according to an intersectant area obtained by means of superimposition.

In this embodiment or some other embodiments of the present invention, the transceiver module 1401 is further configured to:

before the transceiver module 1401 is further configured to receive the auxiliary positioning information reported by the mobile terminal, the transceiver module 1401 is further configured to receive a network identifier that is of a current network and that is reported by the mobile terminal, where the current network is a network with which the mobile terminal has currently registered;

the processor 1405 is configured to find, in a preset database according to the network identifier of the current network, another wireless network that is located in a same area as the current network; and the transceiver module 1401 is further configured to deliver auxiliary search information to the mobile terminal, where the auxiliary search information includes information about the another wireless network, so that the mobile terminal performs network search according to the auxiliary search information to obtain the auxiliary positioning information.

Therefore, by using the auxiliary search information provided by the server, the mobile terminal performs targeted search instead of full-band exhaustive search, so that positioning time is reduced and positioning efficiency is improved.

In this embodiment or some other embodiments of the present invention, the processor 1405 is further configured to: before the transceiver module 1401 delivers the auxiliary search information to the mobile terminal, screen the auxiliary search information according to a preset rule.

Therefore, during screening, auxiliary search information of greatest reference significance for further positioning may be chosen to be delivered, whereas information of little significance for further positioning is filtered out, so that time consumption of a positioning process may be further reduced.

It is understandable that the present invention may be applicable to environments or configurations of multiple universal or dedicated computing systems. For example, a personal computer, a server computer, a handheld device or a portable device, a flat panel device, a multi-processor system, a microprocessor-based system, a set-top box, a programmable consumer electronic device, a network PC, a minicomputer, a mainframe computer, and a distributed computing environment including any one of the foregoing systems or devices.

The present invention may be described in the general context of executable computer instructions executed by a computer, for example, a program module. Generally, the program module includes a routine, a program, an object, a component, a data structure, and the like for executing a particular task or implementing a particular abstract data type. The present invention may also be practiced in distributed computing environments in which tasks are performed by remote processing devices that are connected by using a communications network. In a distributed computing environment, program modules may be located in both local and remote computer storage media including storage devices.

It should be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

The foregoing descriptions are merely specific implementation manners of the present invention. It should be noted that a person of ordinary skill in the art may make several improvements or polishing without departing from the principle of the present invention and the improvements or polishing shall fall within the protection scope of the present invention.

What is claimed is:

1. A mobile terminal positioning method, comprising:
   obtaining, by a mobile terminal, auxiliary positioning information comprising network identifiers of different wireless networks found by the mobile terminal, by:
      reporting a network identifier of a current network to the server, wherein the current network is a network with which the mobile terminal has currently registered;
      receiving auxiliary search information delivered by the server, wherein the auxiliary search information comprises information about another wireless network that is located in a same area as the current network, and the auxiliary search information has been screened according to a preset rule to filter out information that does not aid in positioning; and
      performing a network search according to the auxiliary search information to obtain the auxiliary positioning information;
   reporting the auxiliary positioning information to a server for obtaining current location information of the mobile terminal according to the auxiliary positioning information; and
   receiving the current location information delivered by the server, wherein the current location information is determined according to an intersectant area obtained by superimposing coverage areas of the different wireless networks.

2. The method according to claim 1, wherein performing the network search comprises:
   performing full-band network search separately according to different types of wireless networks in the auxiliary search information to obtain the auxiliary positioning information.

3. The method according to claim 2, wherein performing a network search comprises:
   performing the network search in an idle time of a current application layer service.

4. A mobile terminal positioning device, comprising:
   a transceiver configured to:
      report a network identifier of a current network to a server, wherein the current network is a network with which the mobile terminal has currently registered;
      receive auxiliary search information delivered by the server, wherein the auxiliary search information comprises information about another wireless network that is located in a same area as the current network, and the auxiliary search information has been screened according to a preset rule to filter out information that does not aid in positioning;
      search for network identifiers of different wireless networks according to the auxiliary search information;
   a processor configured to obtain auxiliary positioning information comprising the network identifiers of the different wireless networks found by the transceiver; and
   wherein the transceiver is further configured to:
      report the auxiliary positioning information to the server for obtaining current location information of the mobile terminal according to the auxiliary positioning information, and
      receive the current location information delivered by the server, wherein the current location information is determined according to an intersectant area obtained by superimposing coverage areas of the different wireless networks.

5. The device according to claim 4, wherein to obtain, by the processor, the auxiliary positioning information, the transceiver is configured to perform full-band network search separately according to different types of wireless networks in the auxiliary search information to obtain the auxiliary positioning information, and send the auxiliary positioning information to the processor.

6. The device according to claim 5, wherein to perform the network search, the transceiver is configured to perform the network search in an idle time of a current application layer service.

7. A mobile terminal positioning server, comprising:
   a transceiver configured to:
      receive a network identifier that is of a current network and that is reported by a mobile terminal, wherein the current network is a network with which the mobile terminal has currently registered;

deliver screened auxiliary search information to the mobile terminal, so that the mobile terminal performs network search according to the screened auxiliary search information to obtain auxiliary positioning information; and receive the auxiliary positioning information reported by the mobile terminal, wherein the auxiliary positioning information comprises network identifiers of different wireless networks found by the mobile terminal;

a processor configured to:

find, in a preset database according to the network identifier of the current network, at least one other wireless network that is located in a same area as the current network, and screen auxiliary search information according to a preset rule to filter out information that does not aid in positioning and thereby produce the screened auxiliary search information, wherein the auxiliary search information comprises information about the at least one other wireless network;

obtain corresponding coverage areas of the different wireless networks according to the network identifiers of the different wireless networks, and obtain current location information of the mobile terminal according to the coverage areas of the different wireless networks according to an intersectant area obtained by superimposing the coverage areas of the different wireless networks; and wherein the transceiver is further configured to deliver the current location information to the mobile terminal.

* * * * *